March 29, 1932. E. LIHOTZKY 1,851,317
APPARATUS FOR MAKING STEREOGRAMS
Filed Sept. 4, 1930
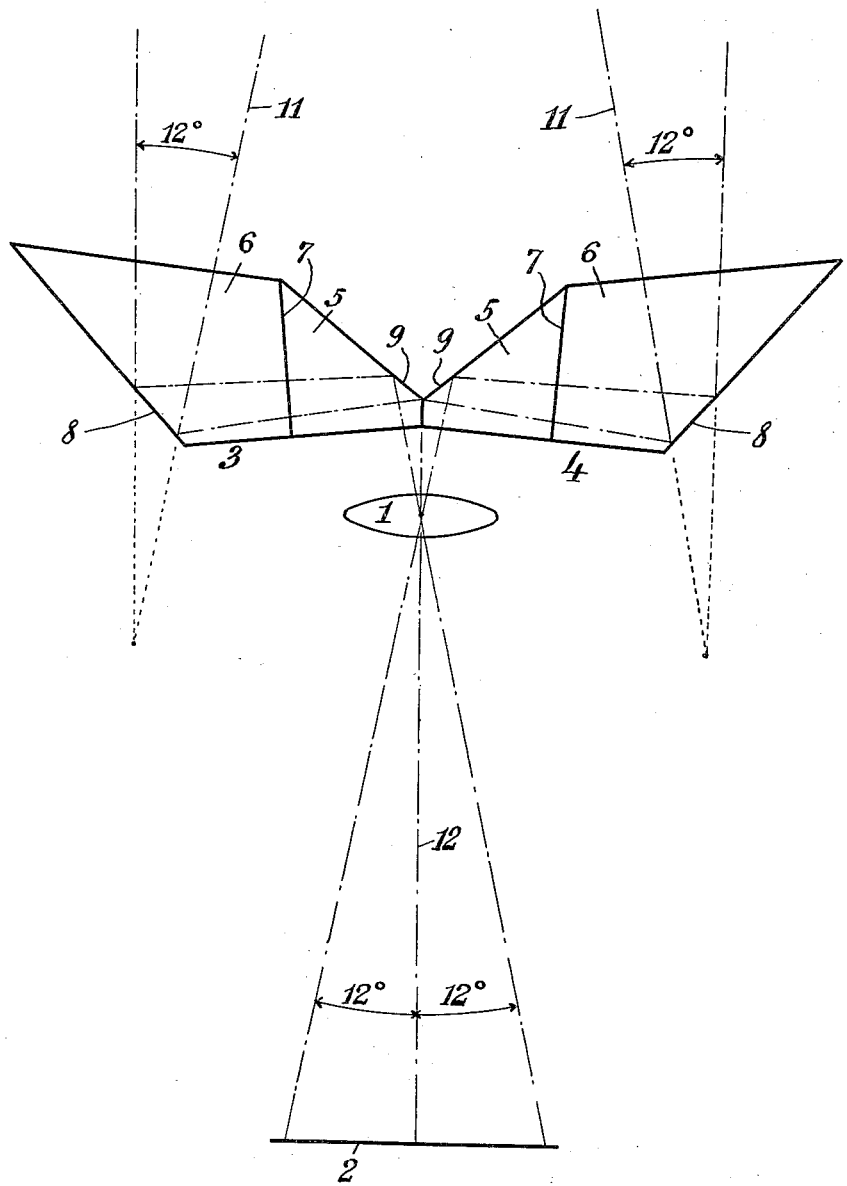
Erwin Lihotzky INVENTOR.
BY
Ivan E. A. Konigsberg
ATTORNEY.

Patented Mar. 29, 1932

1,851,317

UNITED STATES PATENT OFFICE

ERWIN LIHOTZKY, OF WETZLAR, GERMANY, ASSIGNOR TO THE FIRM OF ERNST LEITZ, OF WETZLAR, GERMANY

APPARATUS FOR MAKING STEREOGRAMS

Application filed September 4, 1930, Serial No. 479,606, and in Germany January 7, 1929.

The object of this invention is to provide an improved system or arrangement of prisms or optical means for use in ordinary cameras having but a single objective whereby to utilize such ordinary cameras for the production of stereograms. Ordinary cameras having but a single objective for the purpose of making stereoscopic pictures have been used in the prior art. A suitable arrangement of reflecting means were proposed for reproducing the entrance pupil at two suitable different points, but were not entirely successful or practicable because the two pictures in the stereogram were not sufficiently sharply distinguished or separated from each other and it therefore became necessary to resort to vignetting to a large degree so that the position and width of the sizes of the pictures were dependent to an embarrassing degree upon the objective opening and on the whole only small diaphragms could be used. Vignetting diaphragms were also necessary in order to eliminate traces of adjacent objects which appeared because of partial reflections occurring beyond the border or limit of the total reflection when sufficient exposure was given in order to obtain a picture from the total reflection.

It is the object of this invention to provide optical means for eliminating the disadvantages referred to and whereby perfect stereoscopic pictures may be made by means of a camera having but a single objective. The invention is embodied in a system of prisms or reflecting means which is interposed between the object and the camera objective and arranged in a manner to utilize the limit of total reflection of the incoming rays for obtaining complete separation of the stereoscopic pictures. Another advantage is that if the limit of the total reflection is exceeded, a material decrease in clearness results so that as a rule vignetting is unnecessary or superfluous.

Referring to the accompanying drawing which is a diagrammatic representation of the invention, the reference numeral 1 denotes the objective of the camera. The photographic plate is marked 2, and 3 and 4 designate two identical prismatic systems or arrangements each of which consists of two prisms 5 and 6 which are selected from suitable optical glass material of such sizes and dimensions and of suitable different optical characteristics that the adjacent surfaces 7 may be made parallel and cemented together.

Each of the two prismatic systems 5—6 consists of at least two prisms which are so mounted with respect to each other that the reflected rays within the limit of the total reflection pass through the first prism and into and through the second (or other) prisms, in the latter also within the limit of the total reflection whereby the sum of the reflected rays which pass through all of the prisms is equal to the algebraic sum of the individual reflections. In the drawing this total reflection is represented by a conveniently selected angle value of 12 degrees.

From the drawing it is apparent that the bundle of rays within the total reflection of 12 degrees is first reflected in the surfaces 8 of the prisms 6, hence pass through the common surfaces 7 and finally are totally reflected on the surfaces 9 of the prisms 5. The inside limit 11 of the reflected rays coincide with the optical symmetrical plane 12 and results in a complete separation of the two bundle of rays.

The data and formulæ for determining the sizes, angles and arrangements of the prisms are known to the optical expert in the art and need not be described. The inventive thought resides in the embodiment of two—or more—coupled prisms, one succeeding the other, in which the rays are reflected under the limit of total reflection for complete separation of the two stereoscopic pictures on the photographic plate.

I claim:—

Optical means for making stereograms for use in cameras having but a single objective comprising two symmetrical groups of prisms interposed between the object and the objective of the camera and located equidistant from the optical axis of the objective, each group consisting of at least two prisms having adjacent non-reflecting parallel surfaces cemented together, each prism in each group having a reflecting surface so inclined in optical relationship to the reflecting surface in the adjacent prism and towards the optical axis of the camera that all the rays reflected under the limits of total reflection of the prisms in each group coincide with the inside border of a one part picture, the rays not totally reflected by said prisms being eliminated from the picture by refraction.

Signed at Frankfort A/M., Germany, in the State of Prussia this 23rd day of August, A. D. 1930.

ERWIN LIHOTZKY.